UNITED STATES PATENT OFFICE.

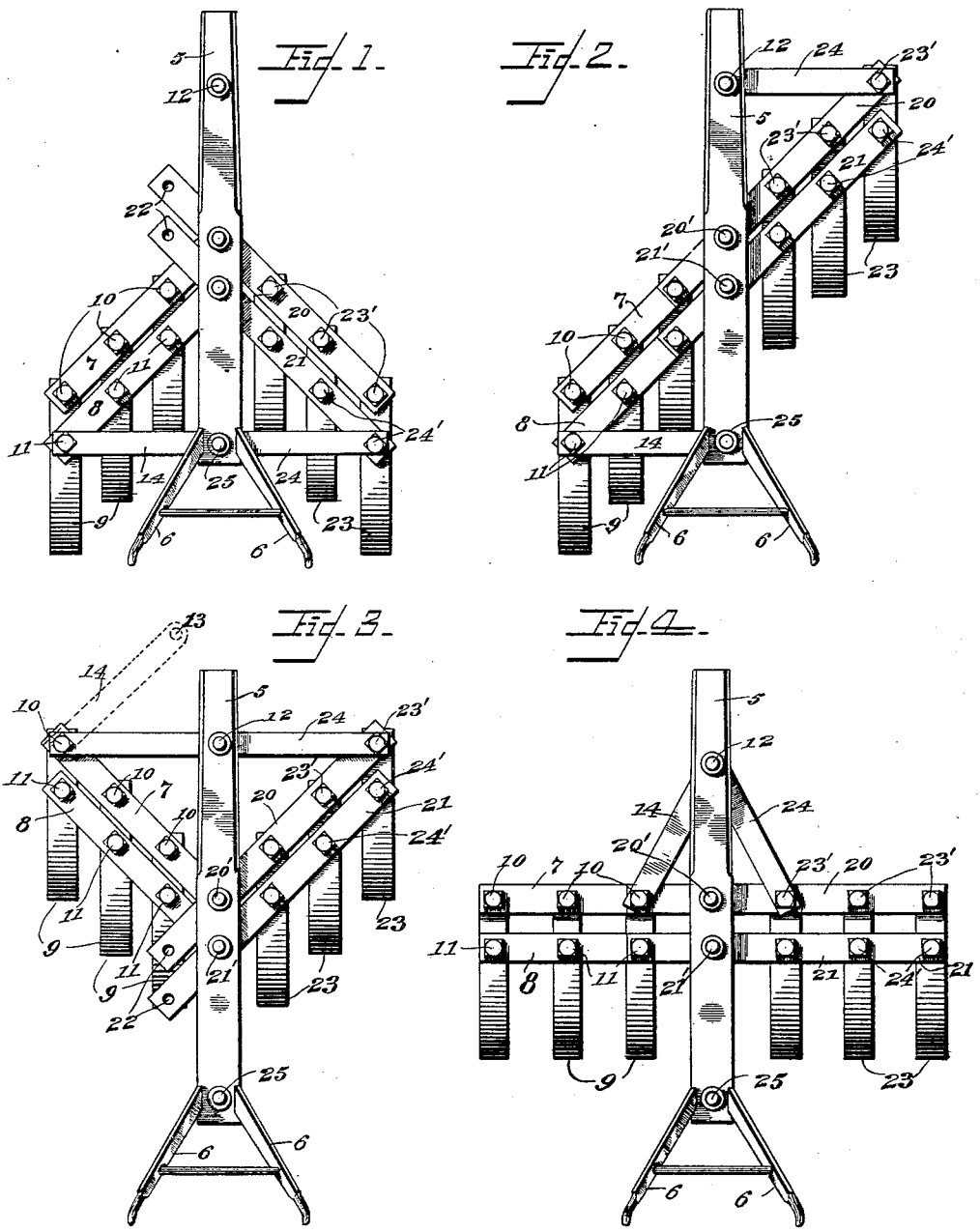

BLANTON E. BLOUNT AND BENJAMEN R. GUICE, OF GRAPELAND, TEXAS.

HARROW.

SPECIFICATION forming part of Letters Patent No. 633,563, dated September 26, 1899.

Application filed June 2, 1899. Serial No. 719,092. (No model.)

*To all whom it may concern:*

Be it known that we, BLANTON E. BLOUNT and BENJAMEN R. GUICE, citizens of the United States, residing at Grapeland, in the county of Houston and State of Texas, have invented a new and useful Harrow, of which the following is a specification.

This invention relates to harrows, and has for its object to provide an implement which may be readily adjusted to adapt it to the usual harrowing operation or for raking in either of two distinct positions.

The implement consists of a beam to which are pivotally connected two elements, which comprise two parallel bars having harrow-teeth secured thereto and projected downwardly therefrom. The ends of one pair of bars project beyond the beam and are perforated to receive pins upon the bars of the other element to hold the respective bars of the two elements in alinement when the implement is in one position and adapt it for raking. In order to hold the elements rigidly in their adjusted positions, brace-bars are pivotally connected with the outer ends of the bars, said brace-bars being perforated at their opposite ends to receive pins carried by the beam. By disengaging the several pins from the engaged parts the elements may be adjusted to the various positions of which the implement is capable.

In the drawings forming a portion of this specification and in which like numerals of reference indicate similar parts in the several views, Figure 1 is a plan view of my harrow, showing the elements thereof adjusted for the harrowing operation. Fig. 2 is a view similar to Fig. 1 and showing one of the elements adjusted to cause its bars to aline with the respective bars of the other element to form a rake and a construction that will discharge the material raked at one side. Fig. 3 is a similar view showing the elements adjusted into a position opposite from that shown in Fig. 1 and forming a drag-rake of the form that will retain the material raked thereby. Fig. 4 shows the adjustment of the implement to cause the elements thereof to extend at opposite sides of and at right angles with the beam.

Referring now to the drawings, our invention consists of a beam 5, having handles 6 at its rear end and adapted at its forward end for the attachment of a draft-animal. At one side of the beam 5 is an element comprising parallel bars 7 and 8, the inner ends of which are pivotally connected, preferably, with the under side of the beam and in such a manner that they may have a pivotal movement with respect to the beam. Pivotally connected at their ends with the beam 7 is a series of harrow-teeth 9, having their rear ends bent downwardly in the usual manner and formed of spring-steel or other suitable material. The horizontal portions of the teeth 9 lying between the bars 7 and 8 serve to maintain parallel alinement of said bars at all points of their pivotal adjustment. The pivots 10 and 11 of the tooth 9, in the form of bolts, are extended upwardly above the bars 7 and 8 for a purpose which will be presently explained.

Passed downwardly through the beam 5 and forwardly of the pivotal connections of the bars 7 and 8 therewith is a pin 12, projecting below the lower face of the beam and adapted to enter a perforation 13 in the brace-bar 14, whose opposite end is pivotally connected with the outer extremity of the bar 7 through the medium of the bolt 10, which forms the pivotal connection of the outermost tooth 9 therewith. Thus when the brace-bar 14 is in engagement with the pin 12 it will hold the bars 7 and 8 against pivotal movement.

On the opposite side of the beam 5 is arranged a second element comprising bars 20 and 21, whose inner ends project beyond the beam and are perforated, as shown at 22. In the rear of the perforations are formed additional perforations through the medium of which the bars are pivotally connected with the under side of the beam, the connection 20' of the bar 20 being common to the bar 7 in the opposite element, while the connection of the bar 21 with the beam 5 is in common with the connection 21' of the bar 8 with said beam, the positions of the perforations 22 being such that when the bar 20 is in alinement with the bar 7 and bar 21 is in alinement with the bar 8, as shown in Fig. 2 of the drawings, said perforations 22 will receive the innermost bolts 10 and 11 to hold the respective bars rigidly in alinement, the bolts being removed for this purpose.

The bars 20 and 21 are disposed parallel, and pivotally connected by bolts 23' and 24', respectively, with the under faces thereof are harrow-teeth 23, which serve to maintain said parallel arrangement.

The pivotal connection of the outermost tooth 23 with the bar 20 extends above the latter and receives a brace-bar 24, whose opposite end is perforated to receive the pin 12 in common with the brace-bar 14. Thus it will be seen that when both of the brace-bars 14 and 24 are in engagement with the pin 12 the implement will assume the form shown in Fig. 3 of the drawings.

In Fig. 2 of the drawings is shown the brace-bar 24, in engagement with the pin 12, while the brace-bar 14 is in engagement with a second pin 25, projected through and below the beam 5, adjacent to its rear end, the perforations 22 in the bars 20 and 21 being in engagement with the pins 10 and 11 of the bars 7 and 8. In this position the implement is adapted for raking and depositing the raked material at one side after the fashion of a scraper, a portion of the raked material, however, remaining in the implement. The brace-bar 14 is in this position engaged with the outermost pivot-bolt 11, as shown.

In Fig. 1 of the drawings I have shown the brace-bar 24 also in engagement with the pin 25, the bars 7 and 8 having been rotated upon their pivots to lie at an angle to the element comprising the bars 20 and 23. To enable this shifting, it is necessary that the bars 14 be first disengaged from the pin 12 and that the pins 10 and 11 be removed from the perforations 22. Also the outer end of the brace 24 is shifted from the outermost bolt 23' to the outermost bolt 24'. Thus it will be seen that in the herein-described construction a single implement may be manufactured which is adaptable to a number of uses, which is simple in its operation, easy in its adjustment, and which may be quickly changed from one style to another by any person, even if unskilled.

It will be readily understood that I may vary the specific construction and arrangement herein shown, that any number of bars may be employed in either element, and that any number and form of teeth may be employed in connection with said bar without departing from the spirit of the invention.

In Fig. 4 of the drawings the implement is shown adjusted to form a straight harrow. Also, as shown in the drawings, the pivotal connections of the harrow-teeth with the bars of the elements are in the form of bolts, and when it is desired to adjust the implement to the form shown in Fig. 4 it is only necessary to disconnect the brace-bars 14 and 24 from the end of the bars 7 and 20 and connect them with the pivots of the innermost teeth of each series where they are connected with the front bars 7 and 20. The opposite ends of the brace-bars are then engaged with the pin 12, and the structure is held rigidly in place.

Having thus described the invention, what is claimed is—

1. A harrow, comprising a beam having independent elements pivotally connected at opposite sides thereof and adapted for adjustment with respect to each other to mutually aline and to lie at various angles to each other, and means carried by the elements and adapted for connection with the beam at opposite sides of the elements to hold them in their adjusted positions.

2. A harrow, comprising a beam having independent elements pivoted thereto at opposite sides thereof and adapted for adjustment to lie at opposite sides of a line drawn transversely of the beam and through the pivotal connections of the elements therewith, and means for holding the elements at different points of their pivotal adjustments.

3. A harrow, comprising a beam, two elements comprising each a pair of bars pivoted to the beam at opposite sides thereof, the ends of the bars at one side projecting beyond the beam and adapted for engagement with the bars of the other side to hold them in mutual alinement, harrow-teeth carried by each element, and means for holding the bars against pivotal movement with respect to the beam.

4. A harrow, comprising a beam, two elements each comprising a plurality of parallel bars pivotally connected with the beam, the bars at one side of the beam being adapted for engagement at times with the bars at the other side of the beam to hold them against movement with respect to each other, and brace-bars pivotally connected with the elements and adapted for connection to the beam to prevent movement of the elements with respect thereto.

5. A harrow comprising a beam, an element at each side of the beam each comprising two parallel bars pivotally connected with the beam, harrow-teeth pivoted to the bars of each element, a front and a rear projection upon the beam, and brace-bars pivoted to each element and adapted to alternately engage the projections on the beam, the bars of one element having projections thereon, and the bars of the other element being extended beyond the beam and having perforations therein adapted to receive the projections on their respective bars of the opposite element.

In testimony that we claim the foregoing as our own we have hereto affixed our signatures in the presence of two witnesses.

BLANTON E. BLOUNT.
BENJAMEN R. GUICE.

Witnesses:
H. S. ROBERTSON,
J. R. RICHARDS.